(12) United States Patent
Runde et al.

(10) Patent No.: US 6,471,297 B1
(45) Date of Patent: Oct. 29, 2002

(54) PIVOTAL AND RETRACTABLE ARMREST ASSEMBLY

(75) Inventors: Paul Runde, Pontiac; Fred D. Powell, Wyandotte, both of MI (US)

(73) Assignee: Magna Seating Systems, Inc., Ontario (CA)

(*) Notice: Subject to any disclaimer, the term of this patent is extended or adjusted under 35 U.S.C. 154(b) by 0 days.

(21) Appl. No.: 09/648,960

(22) Filed: Aug. 25, 2000

(51) Int. Cl.$^7$ ................................................. A47C 7/54
(52) U.S. Cl. ................................... 297/411.32; 297/115
(58) Field of Search ...................... 297/411.32, 411.38, 297/113, 115, 116

(56) References Cited

U.S. PATENT DOCUMENTS

| | | | |
|---|---|---|---|
| 2,661,227 A | * 12/1953 | Murphy | ................. 297/411.32 |
| 4,052,103 A | 10/1977 | Steinthal | |
| 4,159,145 A | 6/1979 | Quakenbush | |
| 4,176,878 A | 12/1979 | Koutsky | |
| 4,400,033 A | 8/1983 | Pietsch | |
| 4,435,011 A | 3/1984 | Hakamata | |
| 4,655,501 A | 4/1987 | Ishigami et al. | |
| 4,674,790 A | 6/1987 | Johnson | |
| 4,969,686 A | 11/1990 | Germain | |
| 5,033,792 A | 7/1991 | Kanazawa | |
| 5,106,160 A | 4/1992 | Nomura et al. | |
| 5,290,092 A | 3/1994 | Geer | |
| 5,292,171 A | 3/1994 | Harrell | |
| 5,409,297 A | 4/1995 | De Filippo | |
| 5,433,503 A | 7/1995 | De Filippo | |
| 5,658,043 A | 8/1997 | Davidson | |

* cited by examiner

Primary Examiner—Jerry Redman
(74) Attorney, Agent, or Firm—Howard & Howard

(57) ABSTRACT

A vehicle seat assembly comprising a seat cushion and a seat back mounted to the seat cushion. An armrest is pivotally mounted to the seat back in a manner which will allows the armrest to rotate relative to the seat back. The seat assembly includes a cam for guiding the armrest in a lateral direction as the armrest is rotated about an axis between a non-use position and a use position. In particular, as the armrest is rotated downward to the use position, the cam forces the armrest to slide outwardly along the axis away from the seat back, and when the armrest is rotated upward to the non-use position the cam directs the armrest to slide inwardly along the axis toward the seat back.

16 Claims, 6 Drawing Sheets

PIVOTAL AND RETRACTABLE ARMREST ASSEMBLY

BACKGROUND OF THE INVENTION

1) Field of the Invention

The subject invention relates to a vehicle seat having a retractable armrest.

2) Description of the Prior Art

Seats assemblies having pivoting armrests are commonly used in all types of seating applications. These types of seat assemblies typically include a shaft that is supported by a seat back. An armrest is mounted on an end of the shaft such that the armrest is allowed to rotate with or about the shaft. An example of this type of seat assembly is disclosed in U.S. Pat. No. 5,106,160.

Other prior art seat assemblies use mechanisms, that include multiple links and pivot points, which allow the armrest to pivot between a use position and a non-use position such as the seat assembly disclosed in U.S. Pat. No. 3,168,346.

Yet another prior art seat assembly involves mounting the armrest to a bracket having a slot to guide the armrest. The armrest includes a pin that extends into the slot. The armrest is pivotally mounted to the bracket such that the pin slides within the limits of the slot. An example of this seat assembly is disclosed in U.S. Pat. No. 5,292,171.

Other prior art seat assemblies include an armrest that is movably supported by a seat back such that the armrest moves laterally toward and away from the seat back when the armrest is pivoted between a non-use position and a use position. Seat assemblies of this type are disclosed in U.S. Pat. Nos. 3,168,346 and 4,159,145. These prior art seats employ either multiple hinges and slides to achieve the lateral movement, or a support structure that requires separate operating motions of first rotating the armrest and then laterally sliding the armrest.

Finally, seat assemblies have been developed which use a spring or some other means to bias an armrest either laterally toward or away from a seat back. These seats allow the armrest to move laterally as the armrest is rotated. Consequently, these type of seat assemblies require that the biasing means be manually overcome when the armrest is moved in the direction opposite the biasing force of the biasing means.

It would be desirable to develop a seat with an armrest assembly that automatically moves laterally with respect to the seat back as the armrest is pivoted between a use position and a non-use position.

SUMMARY OF THE INVENTION AND ADVANTAGES

A vehicle seat assembly according to this invention comprises a seat back and an armrest rotatably supported by the seat back in a manner that allows the armrest to rotate and move laterally relative to the seat back between a non-use and a use position. A cam, defining an axis, interconnects the armrest and the seat back. When moving between the non-use and use positions, the armrest rotates about the axis. As the armrest rotates about the axis, the cam guides the armrest axially along the axis.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
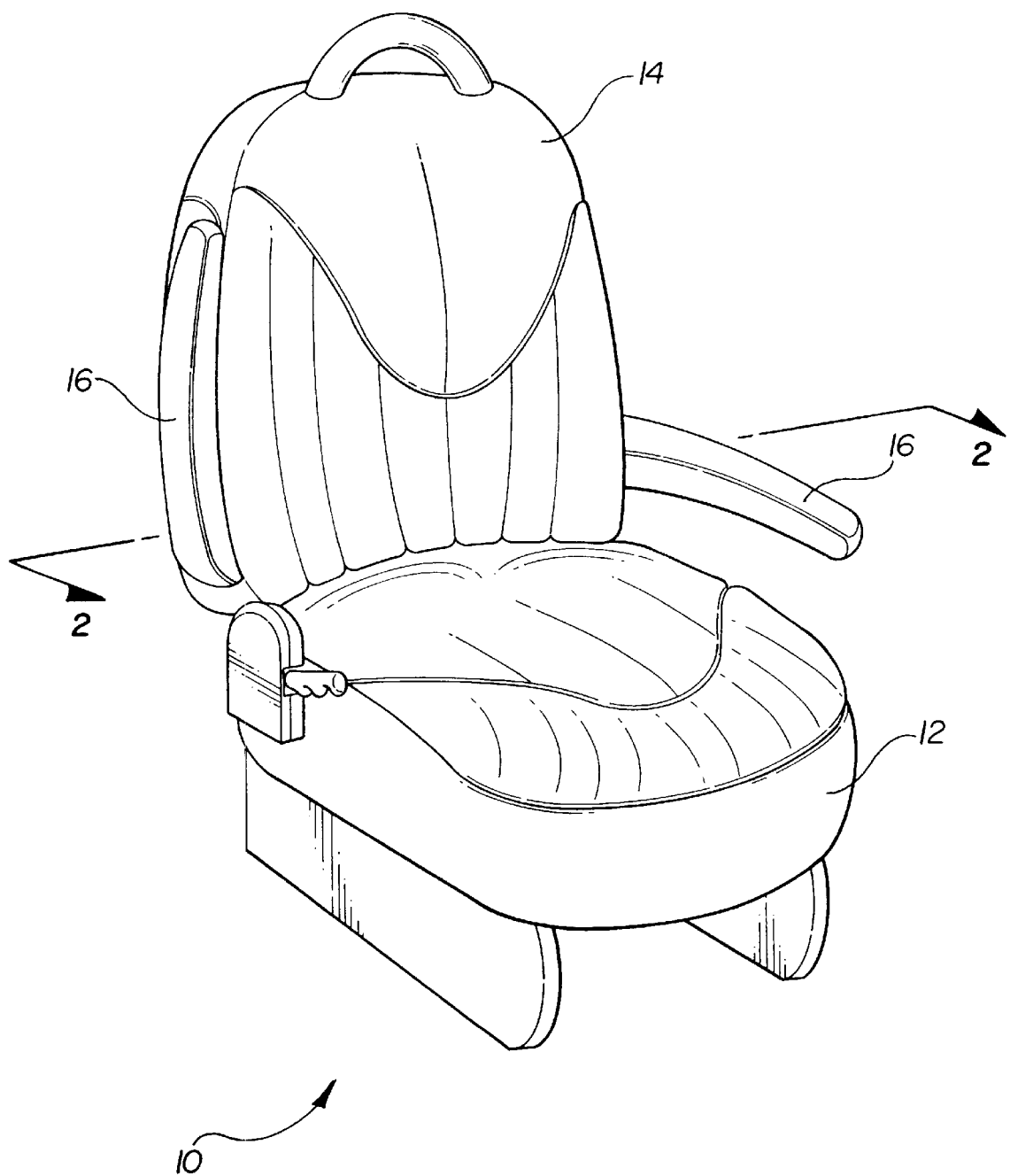
FIG. 1 is a perspective view of a seat assembly according to the present invention.
Figure 2:
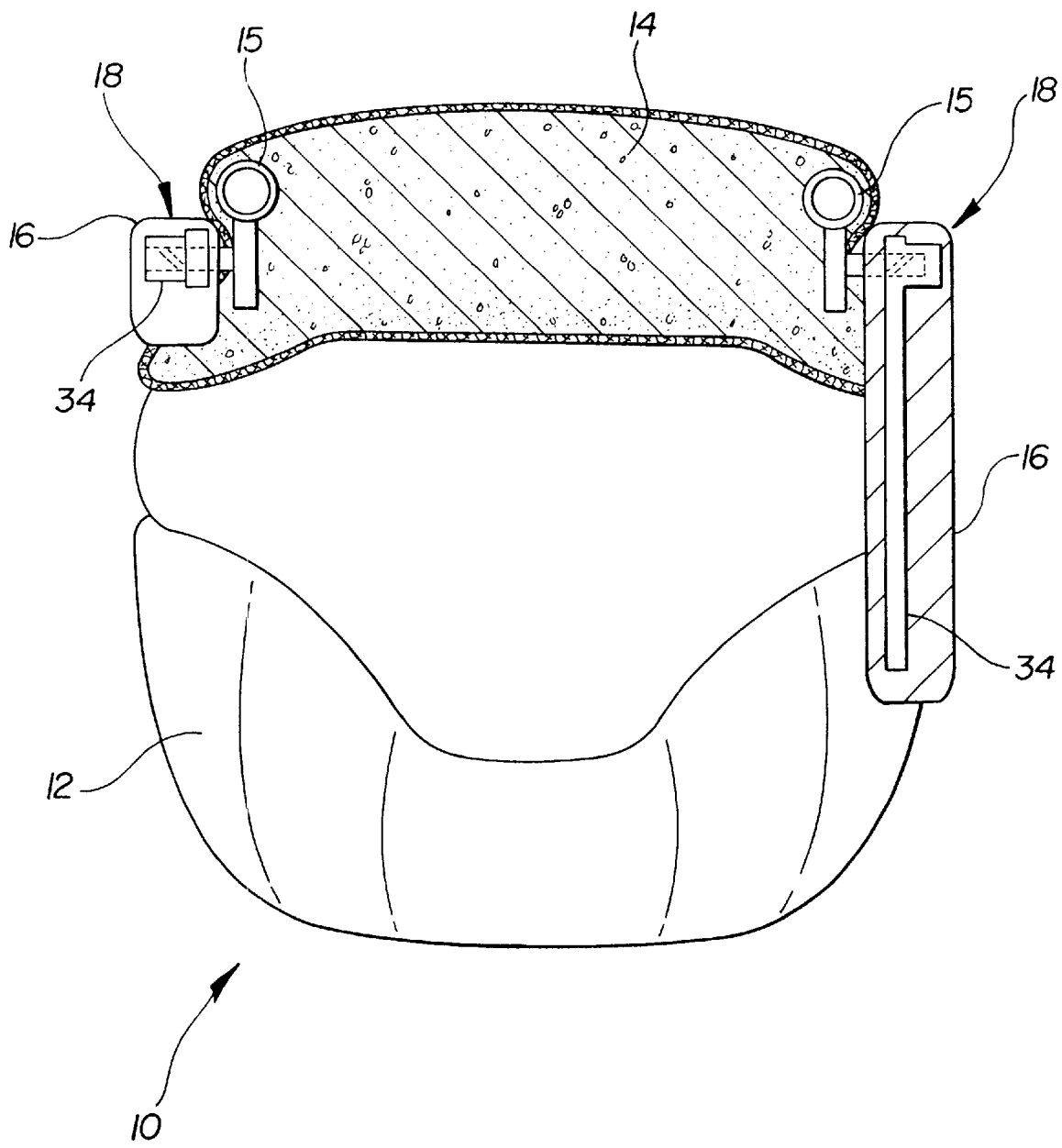
FIG. 2 is a sectional view of the seat assembly taken along line 2—2 of FIG. 1.

Referring to the Figures, wherein like numerals indicate like or corresponding parts throughout the several views, a vehicle seat assembly is generally shown at 10 in FIGS. 1 and 2. The seat assembly 10 includes a seat cushion 12 and a seat back 14 mounted to the seat cushion 12. As understood by those skilled in the art, the seat assembly 10 is preferably a bucket type seat wherein the seat cushion 12 and seat back 14 are of a suitable structure. As shown in FIG. 2, the seat back 14 includes a seat back frame 15 of a suitable type attached to the seat cushion 12 in a suitable manner.

An armrest 16 is rotatably and slidably supported by the seat back 14 for movement between non-use and use positions. It should be appreciated that the seat assembly 10 can include a single armrest 16, or a pair of left and right armrests 16 (as shown). The shape of the armrest 16 can vary, however the armrest 16 preferably has a configuration that is complementary to the profile of the seat back 14 when the armrest 16 is in the non-use position. Specifically, the armrest 16 has an inner surface (not numbered) which is complementary in configuration with a corresponding outer side (not numbered) of the seat back 14.

The left armrest 16, with respect to FIGS. 1 & 2 is shown in the non-use position. When the armrest 16 is in this non-use position, the armrest 16 is roughly vertical and extends upward along side the seat back 14. The right armrest 16, with respect to FIGS. 1 & 2, is shown in the use position. When the armrest 16 is in this use position, the armrest 16 is roughly horizontal and extends forward from the seat back 14. Each of the left and right armrests 16 are substantially mirror images of each other. Hence, for illustrative purposes, only one armrest 16 will be subsequently described.

The seat assembly 10 is characterized by a cam 18 that defines an axis 17. The cam 18 interconnects the armrest 16 and the seat back frame 15. When moving the armrest 16 between the non-use and use positions, the armrest 16 is rotated about the axis 17. As the armrest 16 is rotated about the axis 17, the cam guides the armrest axially along the axis. Preferably, as further described below, the cam 18 directs the armrest 16 to slide inwardly or laterally toward the seat back 14 along the axis 17 when the armrest 16 is rotated about the axis 17 from the use position to the non-use position. Conversely, when the armrest 16 is rotated about the axis 17 from the non-use position to the use position, the cam 18 directs the armrest 16 to slide outwardly or laterally away from the seat back 14 along the axis 17. Alternatively, the cam 18 can be modified, as described below, to direct the armrest 16 in the opposite manner. A cam (not shown) modified consistent with this alternative embodiment directs the armrest 16 to slide outwardly or laterally away from the seat back 14 along the axis 17 as the armrest 16 is rotated from the use position to the non-use position. Conversely, when the armrest 16 is rotated from the non-use position to the use position, the cam of this alternative embodiment directs the armrest 16 to slide inwardly or laterally toward the seat back 14 along the axis 17.

Figure 3:
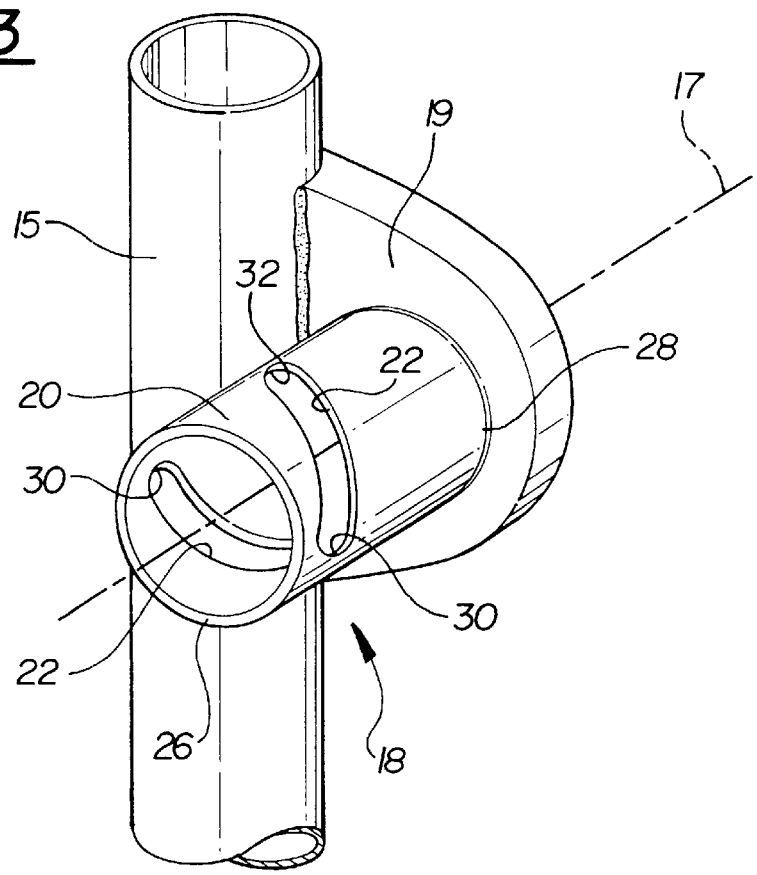
FIG. 3 is a perspective view of a cam in accordance with the subject invention.

Referring to FIG. 3, the cam 18 includes a flange 19 attached to the seat back frame 15. The flange 19 is attached to the seat back frame 15 by any suitable manner such as a welding, bolts, or the like. The cam 18 further includes a cylindrical tube 20 extending from the flange 19. The tube 20 may be integrally formed with the flange 19, or may be welded or otherwise suitably attached to the flange 19. Preferably, the tube 20 is a hollow tube 20 having a pair of helical shaped channels or openings 22 formed on diametrically opposite sides of the tube 20. Alternatively, the tube 20 can include a single channel 22. If only a single channel 22 is employed, the tube 20 may be a solid tube (not shown) with the channel 22 being formed as a groove.

The tube 20 includes an outer end 26 and an inner end 28. The helical shaped channels 22 each include a first end 30 and a second end 32. The channels 22 are oriented such that the first ends 30 and the second ends 32 of the channels 22 are adjacent the outer end 26 and the inner end 28 of the tube 20, respectively, with the channels 22 extending helically around the tube 20 between the first and second ends 30, 32.

Figure 4:
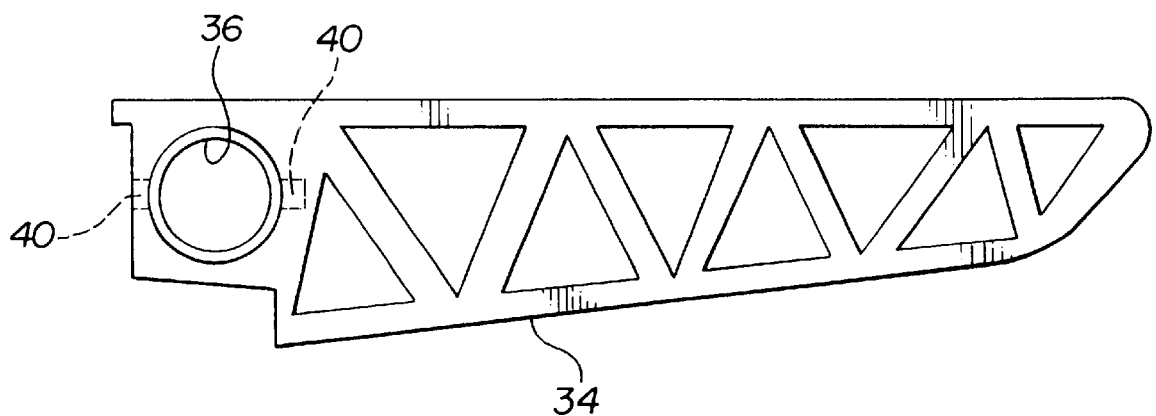
FIG. 4 is a side view of a frame for the armrest of the present invention.

Referring to FIG. 4, the armrest includes an armrest frame 34 for supporting the armrest 16. The armrest frame 34 includes an aperture 36 for receiving the tube 20. The armrest frame 34 also includes a pair of circular bores 40 extending into the armrest frame 34. In particular, there is one bore 40 formed within the frame 34 on one side of the aperture 36 with another bore 40 formed within the frame 34 on an opposing side of the aperture 36 with the bores 40 aligned to span the aperture 36.

Figure 5:
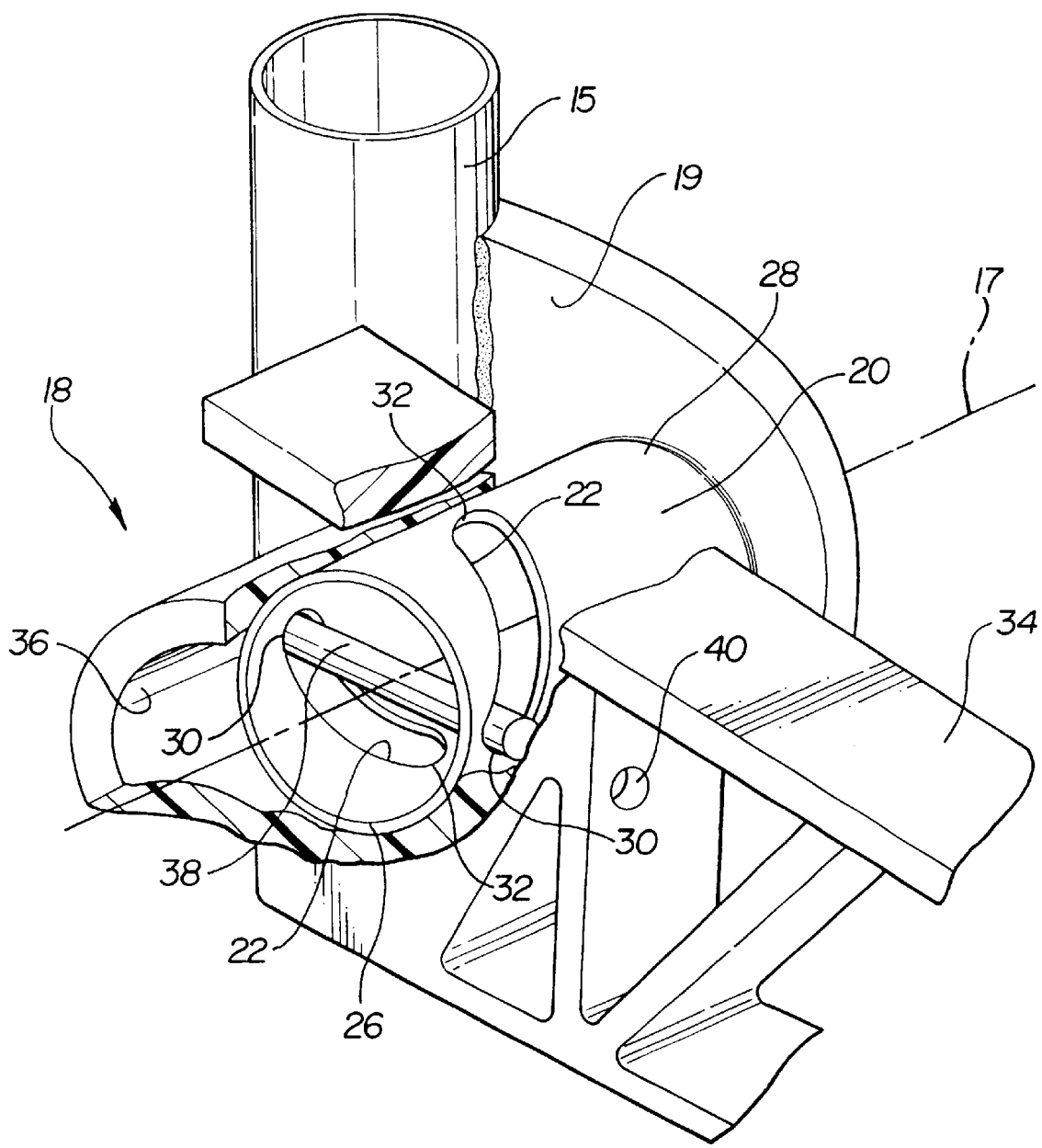
FIG. 5 is a fragmentary and partially cut away perspective view of the cam and the armrest frame shown from the front and in the use position.

Referring to FIGS. 5, the armrest frame 34 is mounted to the cam 18. A cam follower 38 is included to secure the frame 34 to the cam 18. The cam follower 38 preferably comprises at least one guide pin 38 which is supported within the armrest frame 34 and disposed in the helical shaped channels 22. Preferably, the guide pin 38 extends through both channels 22 in the tube 20 and is supported by each bore 40 of the armrest frame 34.

During assembly of the armrest 16, the armrest 16 is placed onto the tube 20 and the pin 38 is inserted through one of the circular bores 40. The pin 38 extends through the channels 22 within the tube 20 and into the opposite circular bore 40. Alternatively, if the tube 20 includes only one channel 22, the pin 38 will be supported at one end, and extend into the tube 20 through the single channel 22 in a cantilevered fashion.

Figure 6:
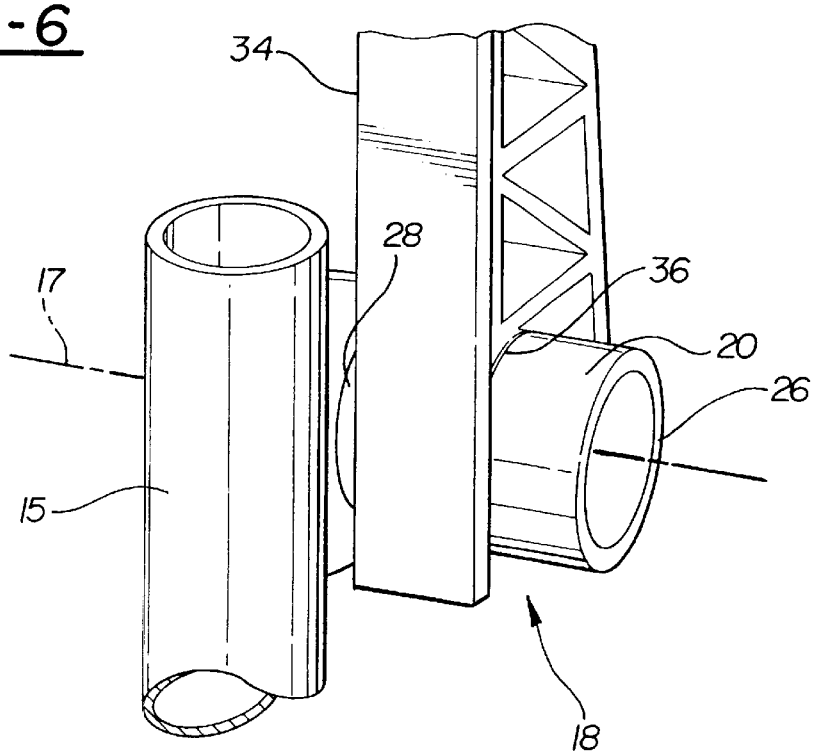
FIG. 6 is a fragmentary view of the cam and the armrest frame shown in a non-use position.
Figure 7:
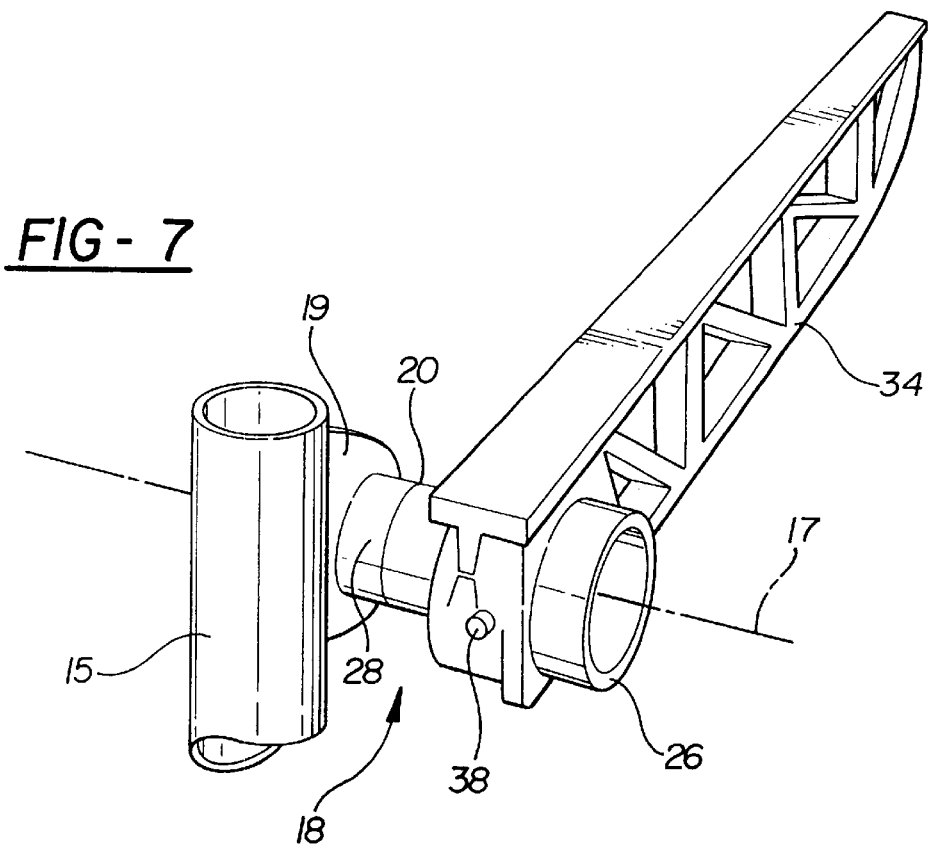
FIG. 7 is a perspective view of the cam and the armrest frame shown from the rear and in a use position.

The armrest frame 34 is shown in the use and non-use positions in FIGS. 6 and 7, respectively. In moving from the non-use position to the use position, the armrest 16 is rotated downward. As the armrest is rotated, the guide pin 38 follows the helical shaped channels 22 to move the armrest 16 laterally away from the seat back 14. Similarly, when the armrest 16 is rotated upward to the nonuse position, the guide pin 38 moves the armrest 16 laterally inward toward the seat back 14. The helical pattern of the channel 22 or channels 22 directs the armrest 16 to move laterally along the tube 20 simultaneously as the armrest 16 is rotated about the tube 20.

Figure 8:
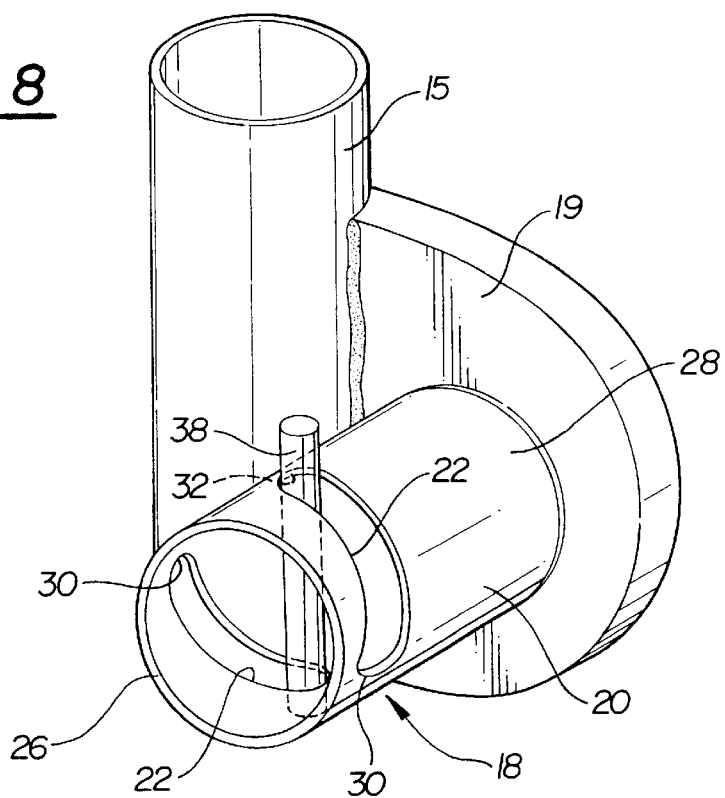
FIG. 8 is a perspective view of the cam and a guide pin shown in the non-use position.
Figure 9:
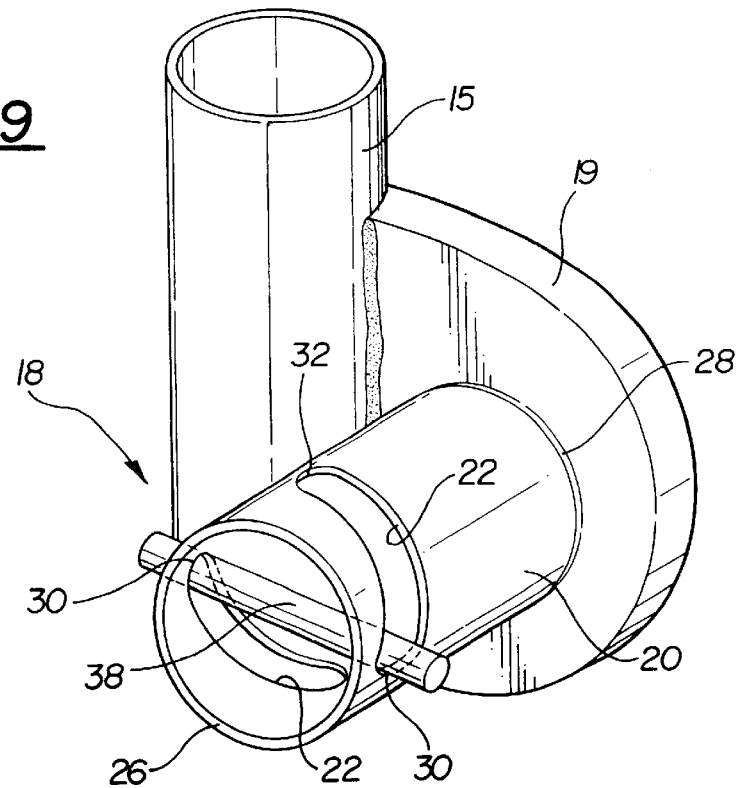
FIG. 9 is a perspective view of the cam and the guide pin shown in the use position.

Referring to FIGS. 8 and 9, the armrest frame 34 is removed such that the movement of the pin 38 between the use and one-use positions within the cam 18 is best illustrated. When the armrest 16 is pivoted toward the non-use position, the guide pin 38 is directed along the channels 22 to the second ends 32 of the channels 22, as shown in FIG. 8. This movement directs the armrest 16 laterally along the tube 20 toward the seat back 14. In the non-use position, the armrest 16 is in close proximity to the seat back 14. When the armrest 16 is rotated downward to the use position the guide pin 38 is directed along the channels 22 until the guide pin 38 abuts the first ends 30 of the channels 22, as shown in FIG. 9. This movement directs the armrest 16 laterally along the tube 20 away from the seat back 14. In the use position, the armrest 16 is positioned away from the seat back 14 so as to not interfere with the seating area for the passenger using the seat assembly 10.

As discussed above, the cam 18 may be modified so that the armrest 16 moves toward the seat back 14 when the armrest 16 is rotated toward the use position and away from the seat back 14 when the armrest 16 is rotated toward the non-use position. In this alternative embodiment, the cam 18 is modified by reversing the orientation of the channels 22. Specifically, the first and second ends 30 and 32 of the channels are adjacent the inner and outer ends 26 of the tube 20, respectively.

Although not shown, the cam 18 and cam follower 38 of the seat assembly 10 could be altered such that a guide pin is supported by a tube and an armrest includes a helical shaped channel or channels. In this embodiment, the pin stays stationary along with the tube as the armrest is rotated along an axis of rotation. The armrest of this embodiment is directed inwardly or outwardly by the channels riding on the pin as the armrest is rotated about the tube.

A further embodiment (also not shown) includes a tube that is movable laterally within a seat back and an armrest that is mounted securely to the tube. In this embodiment, a guide pin is mounted to the tube, and a seat back frame includes a helical shaped channel or channels to direct the tube inward and outward as the armrest and tube are rotated. This embodiment may be altered where the tube includes a helical channel or channels and the seat back frame includes a stationary pin.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that the invention may be practiced otherwise than as specifically described.

What is claimed is:

1. A vehicle seat assembly comprising;
   a seat back;
   an armrest rotatably supported by said seat back for movement between a non-use position and a use position;
   a cam defining an axis and interconnecting said armrest and said seat back, said cam having at least a pair of helical shaped channels for guiding said armrest axially along said axis as said armrest is rotated about said axis when said armrest moves between said non-use and use positions; and a cam follower movable within said helical shaped channels as said armrest rotates relative to said seat back for guiding said armrest axially along said axis.

2. An assembly as set forth in claim 1 wherein said cam is further defined as a tube having said helical shaped channels formed on diametrically opposite sides of said tube.

3. An assembly as set forth in claim 2 wherein said cam follower is further defined as at least one guide pin mounted to said armrest and disposed within said helical shaped channels.

4. An assembly as set forth in claim 3 wherein said tube includes an outer surface with an outer end and an inner end and each of said helical shaped channels including a first end and a second end, wherein said channels are oriented such that said first end of said channels are adjacent said outer end of said tube and said channels extend helically around said outer surface until said second end of said channels are adjacent said inner end of said tube such that said guide pin follows said helical shaped channels and said armrest moves axially away from said seat back when said armrest is rotated downward to said use position, and said armrest moves axially inward toward said seat back when said armrest is rotated upward to said non-use position.

5. An assembly as set forth in claim 3 wherein said armrest has an inner surface which is complementary in configuration with a corresponding outer side of said seat back.

6. An assembly as set forth in claim 2 wherein said cam follower is further defined as a guide pin mounted to said armrest and extending through both of said helical shaped channels.

7. An assembly as set forth in claim 6 wherein said guide pin includes opposite ends extending through a portion of said armrest.

8. An assembly as set forth in claim 7 wherein said armrest further includes an armrest frame with said guide pin extending at least partially into said armrest frame.

9. A vehicle seat assembly comprising;

a seat back;

a tube having an axis and mounted to said seat back, said tube having at least one helical channel extending helically about said axis;

an armrest having an armrest frame defining an aperture to receive said tube for rotatably supporting said armrest on said seat back for movement between a non-use position and a use position, said armrest frame including at least one bore formed within a side of said aperture;

at least one guide pin having opposite ends with one of said ends extending into said bore to secure said guide pin to said armrest frame with said guide pin extending into said aperture, said guide pin engaging said helical channel such that said guide pin is movable within said helical shaped channel as said armrest rotates relative to said seat back for guiding said armrest axially along said axis as said armrest is rotated about said axis when said armrest moves between said non-use and use positions.

10. An assembly as set forth in claim 9 wherein said armrest frame is formed of a polymeric material.

11. An assembly as set forth in claim 8 wherein said tube includes a pair of said helical channels extending helically about said axis on diametrically opposite sides of said tube.

12. An assembly as set forth in claim 11 wherein said guide pin extends through both of said helical channels when said armrest is mounted to said tube.

13. An assembly as set forth in claim 12 wherein said tube includes an outer surface with an outer end and an inner end and each of said helical channels including a first end and a second end, wherein said helical channels are oriented such that said first end of said channels are adjacent said outer end of said tube and said channels extend helically around said outer surface about said axis until said second end of said channels are adjacent said inner end of said tube such that said guide pin follows said helical channels and said armrest moves axially away from said seat back when said armrest is rotated downward to said use position, and said armrest moves axially inward toward said seat back when said armrest is rotated upward to said non-use position.

14. An assembly as set forth in claim 12 wherein said armrest frame includes a pair of bores formed within opposing sides of said aperture.

15. An assembly as set forth in claim 14 wherein said guide pin includes opposite ends with said ends extending into said bores to secure said guide pin to said armrest.

16. An assembly as set forth in claim 15 wherein said armrest frame is formed of a polymeric material.

* * * * *